United States Patent
Weill et al.

(10) Patent No.: US 9,224,238 B2
(45) Date of Patent: Dec. 29, 2015

(54) SEAMLESS TEXTURING OF 3D MESHES OF OBJECTS FROM MULTIPLE VIEWS

(71) Applicant: Google Inc., Mountain View, CA (US)

(72) Inventors: Jonathan Weill, Ganey Tikva (IL); Dror Aiger, Ramat Gan (IL)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 14/098,659

(22) Filed: Dec. 6, 2013

(65) Prior Publication Data

US 2015/0161812 A1      Jun. 11, 2015

(51) Int. Cl.
  *G06T 15/00* (2011.01)
  *G06T 15/20* (2011.01)
  *G06T 15/04* (2011.01)

(52) U.S. Cl.
  CPC .............. *G06T 15/205* (2013.01); *G06T 15/04* (2013.01)

(58) Field of Classification Search
  None
  See application file for complete search history.

(56) References Cited

U.S. PATENT DOCUMENTS

| | | | | |
|---|---|---|---|---|
| 6,300,958 B1 * | 10/2001 | Mallet | ............... | G06T 15/04 345/442 |
| 6,469,710 B1 * | 10/2002 | Shum | ............... | G06T 15/04 345/619 |
| 2004/0227766 A1 * | 11/2004 | Chou | ............... | G06T 15/04 345/582 |

OTHER PUBLICATIONS

Szeliski, "Image Alignment and Stitching: A Tutorial", Microsoft Research, www.research.microsoft.com (2006).
Niem et al., "Mapping Texture From Multiple Camera Views onto 3D-Object Models for Computer Animation", Universitat Hannover, (1995).

* cited by examiner

*Primary Examiner* — Kee M Tung
*Assistant Examiner* — Frank Chen
(74) *Attorney, Agent, or Firm* — McDonnell Boehnen Hulbert & Berghoff LLP (57) ABSTRACT

Methods and systems for texturing of three-dimensional (3D) object data models are provided. An example method may include receiving information indicating a geometry of an object receiving a plurality of images of the object. The method may also include assigning images of the plurality of images that have a resolution above a threshold to a plurality of polygons that approximate the geometric surface of the object. The method may also include determining adjacent polygons that are assigned to different images of the plurality of images so as to identify boundaries of images and minimizing such boundaries. The method may also include determining a mismatch factor for boundaries of the modified boundaries of images and reassigning images in boundaries having a mismatch factor above a threshold so as to reduce a gradient variation between the images in the modified boundaries.

20 Claims, 7 Drawing Sheets

SEAMLESS TEXTURING OF 3D MESHES OF OBJECTS FROM MULTIPLE VIEWS

BACKGROUND

In computer graphics, three-dimensional modeling (3D) involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

In one aspect, the present disclosure provides a method. The method may include receiving information indicating a geometry of an object, where the information indicating the geometry of the object comprises a plurality of polygons that approximate a geometric surface of the object. The method may also include receiving a plurality of images of the object, where each of said plurality of images illustrate the object from a different respective angle. The method may also include assigning images of the plurality of images that have a resolution above a threshold to polygons of the plurality of polygons. The method may also include determining adjacent polygons that are assigned to different images of the plurality of images so as to identify boundaries of images. The method may also include determining an image of the plurality of images that is assigned to a threshold number of polygons in a proximity of one of the adjacent polygons and reassigning the image that is assigned to the threshold number of polygons to the adjacent polygons so as to modify the boundaries of images. The method may also include determining a mismatch factor for boundaries of the modified boundaries of images. The method may also include reassigning images in boundaries having a mismatch factor above a threshold so as to reduce a gradient variation between the images in the modified boundaries.

In another aspect, the present disclosure provides a non-transitory computer readable memory having stored thereon that, in response to execution by a computing device, cause the computing device to perform functions. The functions may include receiving information indicating a geometry of an object, where the information indicating the geometry of the object comprises a plurality of polygons that approximate a geometric surface of the object. The functions may also include receiving a plurality of images of the object, where each of said plurality of images illustrate the object from a different respective angle. The functions may also include assigning images of the plurality of images that have a resolution above a threshold to polygons of the plurality of polygons. The functions may also include determining adjacent polygons that are assigned to different images of the plurality of images so as to identify boundaries of images. The functions may also include determining an image of the plurality of images that is assigned to a threshold number of polygons in a proximity of one of the adjacent polygons and reassigning the image that is assigned to the threshold number of polygons to the adjacent polygons so as to modify the boundaries of images. The functions may also include determining a mismatch factor for boundaries of the modified boundaries of images. The functions may also include reassigning images in boundaries having a mismatch factor above a threshold so as to reduce a gradient variation between the images in the modified boundaries.

In another aspect, the present disclosure provides a system. The system may include at least one processor and data storage including program instructions executable by the at least one processor to cause the system to perform functions. The functions may include receiving information indicating a geometry of an object, where the information indicating the geometry of the object comprises a plurality of polygons that approximate a geometric surface of the object. The functions may also include receiving a plurality of images of the object, where each of said plurality of images illustrate the object from a different respective angle. The functions may also include assigning images of the plurality of images that have a resolution above a threshold to polygons of the plurality of polygons. The functions may also include determining adjacent polygons that are assigned to different images of the plurality of images so as to identify boundaries of images. The functions may also include determining an image of the plurality of images that is assigned to a threshold number of polygons in a proximity of one of the adjacent polygons and reassigning the image that is assigned to the threshold number of polygons to the adjacent polygons so as to modify the boundaries of images. The functions may also include determining a mismatch factor for boundaries of the modified boundaries of images. The functions may also include reassigning images in boundaries having a mismatch factor above a threshold so as to reduce a gradient variation between the images in the modified boundaries.

In yet another aspect, a system may include a means for receiving information indicating a geometry of an object, where the information indicating the geometry of the object comprises a plurality of polygons that approximate a geometric surface of the object. The system may also include a means for receiving a plurality of images of the object, where each of said plurality of images illustrate the object from a different respective angle. The system may also include a means for assigning images of the plurality of images that have a resolution above a threshold to polygons of the plurality of polygons. The system may also include a means for determining adjacent polygons that are assigned to different images of the plurality of images so as to identify boundaries of images. The system may also include a means for determining an image of the plurality of images that is assigned to a threshold number of polygons in a proximity of one of the adjacent polygons and a means for reassigning the image that is assigned to the threshold number of polygons to the adjacent polygons so as to modify the boundaries of images. The system may also include a means for determining a mismatch factor for boundaries of the modified boundaries of images. The system may also include a means for reassigning images in boundaries having a mismatch factor above a threshold so as to reduce a gradient variation between the images in the modified boundaries.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for seamless texturing of three-dimensional (3D) object data models from multiple calibrated views. A 3D image of an object may be generated by using a model having a mesh including a plurality of polygons as a first input and a set of images of the object as a second input. In one example, the mesh including a plurality of polygons may be a triangular mesh. The examples described herein include the triangular mesh, although other polygons are possible. The triangular mesh may include several points connected by lines to create triangles that may be used to approximate the geometric surface of the object. The more triangles that are present in the model, the more accurate the approximation, for example.

Next, a set of images of the object may be input into the model. The set of images represent the object from many different angles. Each triangle in the triangle mesh may then be assigned a particular image. Each triangle has a single image that has the highest resolution for that particular triangle, in some examples. However, if the model only assigned the image based on the highest resolution for that triangle, there may be many different images used to texture all of the different triangles, which may lead to texture distortion seams between triangles. Therefore, an approach that minimizes texture distortion associated with the boundaries between triangles mapped from different images may be desirable.

Minimizing texture distortion can be accomplished in some examples through optimization of three objectives: (1) maximize the resolution of the assigned image for each individual triangle; (2) minimize the total length of the boundaries between texture models; and (3) minimize the boundary crossings in highly textured areas. In this context, in some examples a "boundary" may refer to an edge (e.g., two vertices in the mesh such that there is a single triangle that contains both) in which the two triangles sharing that edge are assigned to different images. Further, a "highly textured area" can include an area where an image experiences significant changes, such as a change in color, pixel value, or gradient. In order to optimize the three objectives described above, example methods are described. In a first aspect, the method may be executed to assign every triangle independently to the image with the highest projected resolution. In a second aspect, the method may apply a local and iterative process to reduce the total boundaries length. In another aspect, the method may apply another local and iterative process that "routes" the boundaries to regions where there is more agreement between the images.

Figure 1:
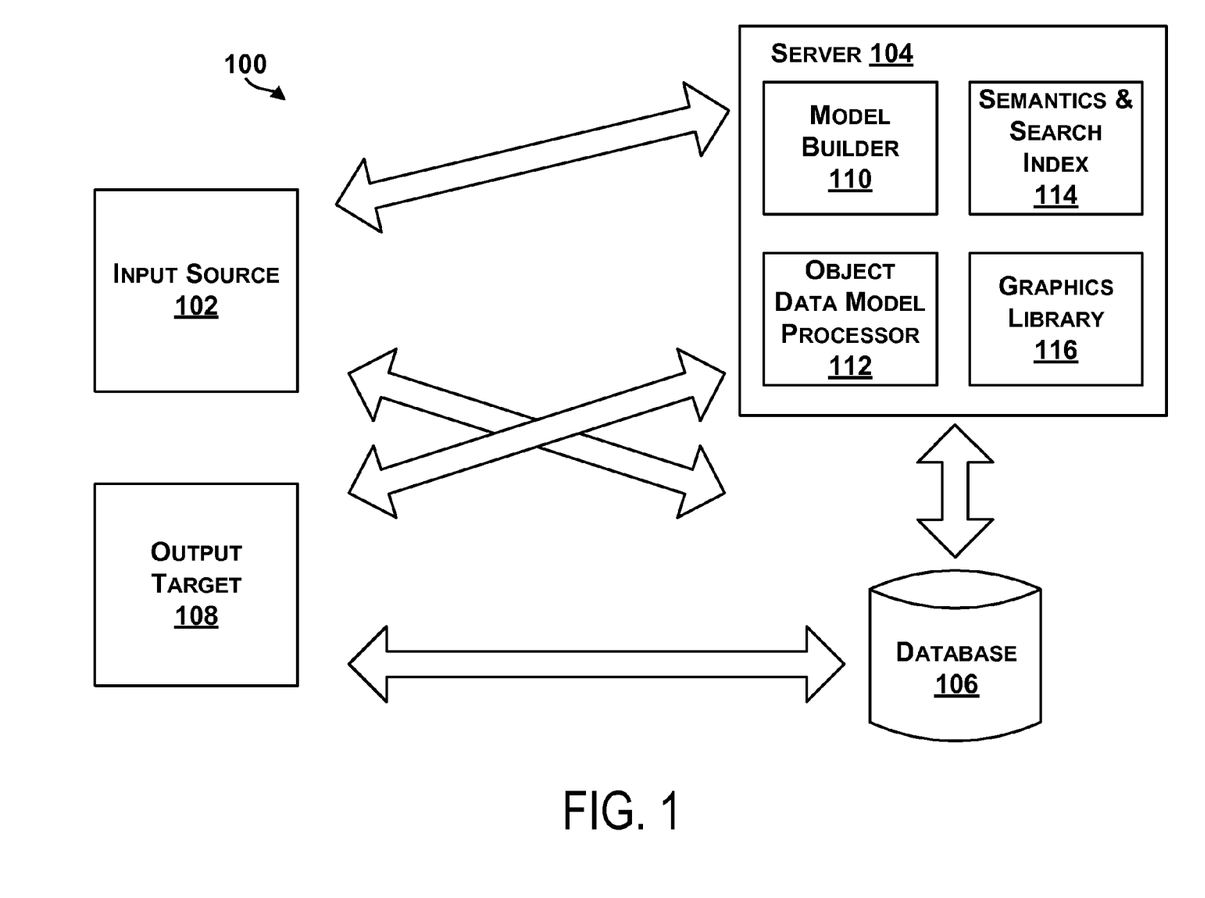
FIG. 1 illustrates an example system for object data modeling.

Referring now to the figures, FIG. 1 illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets (H) that have colors but no ultraviolet (UV) unwrapping to generate a mesh (D) with UV unwrapping but no colors. As an example, for a single output texture pixel of an image processing may include, for a given point in UV determine a triangle in the mesh's UV mapping (D), and using triangle-local coordinates, move to an associated 3D point on the mesh. A bidirectional ray may be cast along the triangle's normal to intersect with the mesh (H), and color, normal and displacement may be used for an output. To generate an entire texture image, each pixel in the image can be processed.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

As discussed above, a 3D object may be modeled using a wireframe built of triangles or other polygons to approximate the geometric surface of the object, and the triangles may be textured using multiple camera images. Therefore, each triangle of the wireframe model can be assigned to one camera image. In some cases, two triangles that share a boundary may be textured from different images, which may lead to texture distortion seams between those triangles. Therefore, an approach that minimizes texture distortion associated with the boundaries between triangles mapped from different images may be desirable.

Figure 2A:
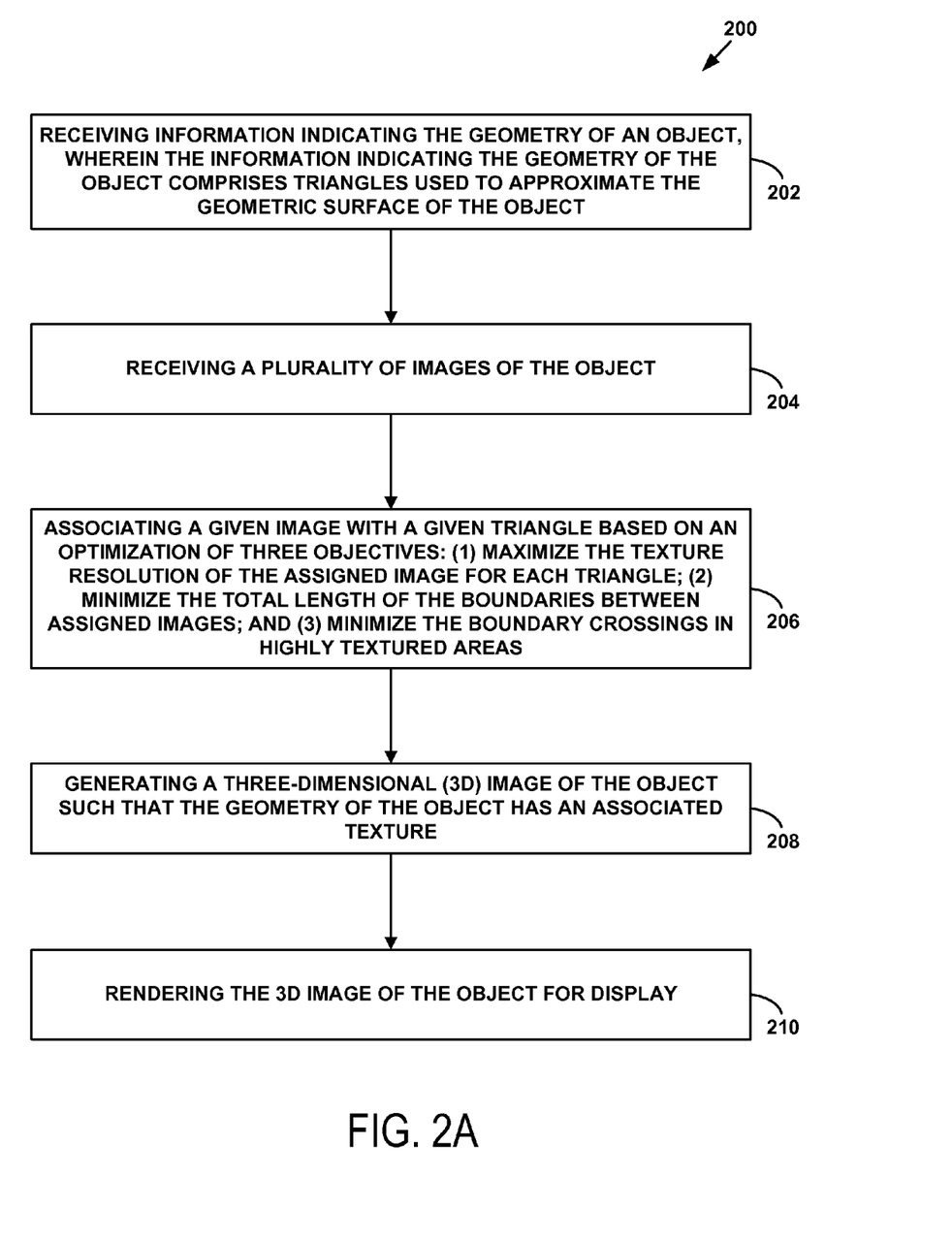
FIG. 2A is a block diagram of an example method for seamless texturing of three-dimensional (3D) object data models.

FIG. 2A is a block diagram of an example method for seamless texturing of 3D object models. Method 200 shown in FIG. 2A presents an embodiment of a method that could be used by the system 100 of FIG. 1, for example. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or or removed based upon the desired implementation.

In addition, for the method 200 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2A may represent circuitry that is wired to perform the specific logical functions in the process.

Initially, at block 202, the method 200 includes receiving information indicating the geometry of an object. The information indicating the geometry of the object may be received by a device, such as a computing device or server, as examples. In some examples, the information indicating the geometry of the object includes a wireframe built of triangles or other polygons that are used to approximate the geometric surface of the object. The more triangles that are used in the wireframe, sometimes the better the approximation. The wireframe triangular mesh may thus represent a 3D object data model. In some examples, such 3D object data models may be provided by a server in a format suitable for display in a web browser or other application. The 3D object data models may be of any size and include and represent any number of objects.

At block 204, the method 200 includes receiving a plurality of images of the object. The plurality of images may be received by a device, such as a computing device or server, as examples. The plurality of images may be captured by a camera, such as a CCD TV camera as an example. The plurality of images may include images of the object taken from different angles. In one example, a camera may be set up in a stationary position, and the object may be placed on a turntable configured to rotate and a known angular velocity. The camera may then be configured to take a picture at set time intervals as the object rotates on the turntable. In another example, the object may be set up in a stationary position, and the camera may be configured to rotate around the object at a known angular velocity and may further be configured to take a picture at set time intervals. Other examples are possible as well.

At block 206, the method 200 includes associating a given image with a given triangle of the wireframe triangular mesh representing the geometric surface of the object. Each image is used to provide texture to the previously untextured 3D triangular mesh. This process may be performed by the server, such as by the object data model processor 112 as an example. Once the plurality of images of the object are received, the method continues with assigning a particular image of the plurality of images of the object to each individual triangle of the triangular mesh. This process may be referenced as the image assignment or the view assignment. The image assignment attempts to optimize the following objectives: (1) maximize the texture resolution of the assigned image for each triangle; (2) minimize the total length of the boundaries between texture models; and (3) minimize the boundary crossings in highly textured areas. These objectives will be discussed in more detail below with reference to FIG. 2B.

At block 208, the method 200 includes generating a 3D image of the object such that the geometry of the object has an associated texture. The associated texture is provided by the image assignment determined from the optimization of the three objectives discussed above. The result is a 3D data model with improved transitions from view-to-view (or angle to angle) when the object is rotated. The texture of the 3D object model will have relatively smooth seams between triangles and have minimal differences between the texture in transitions between the views. In some examples, an additional blending process may be performed to further eliminate seams between assigned images. In one example, Poisson blending may be used. Other examples are possible as well.

At block 210, the method 200 includes rendering the 3D image of the object for display. A computing device or image generation module may be configured to generate the 3D image or of the object and may be configured to render the 3D image of the object for display to create a 3D visualization of the object for a user to view fine details of the object from any angle and zoom in and out, for example.

Figure 2B:
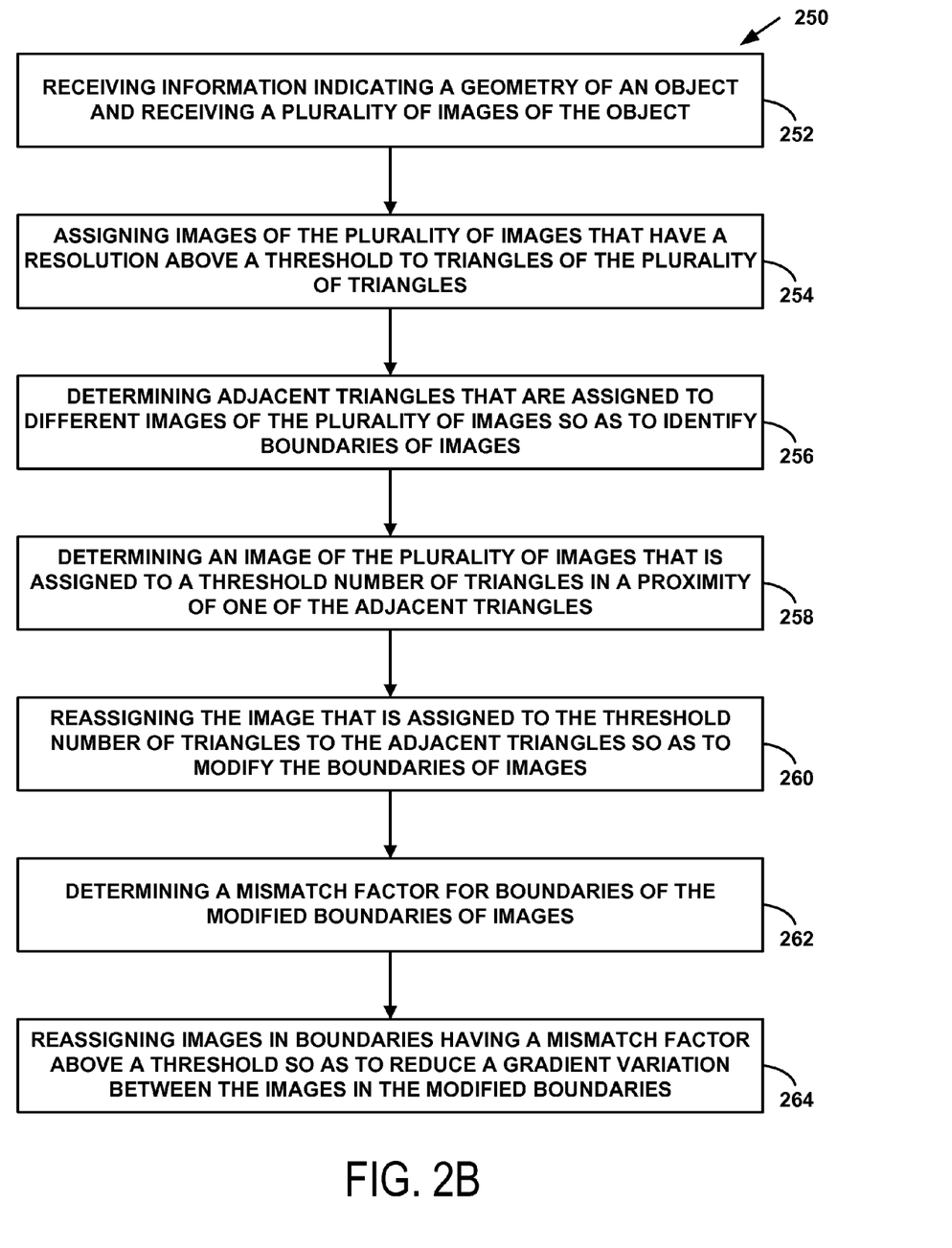
FIG. 2B is a block diagram of another example method for seamless texturing of 3D object data models.

FIG. 2B is a block diagram of another example method for seamless texturing of 3D object models. Method 250 shown in FIG. 2B presents an embodiment of a method that could be used by the system 100 of FIG. 1, for example. Method 250 may include one or more operations, functions, or actions as illustrated by one or more of blocks 252-264. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 252, the method 250 includes receiving information indicating a geometry of an object and receiving a plurality of images of the object. As discussed above, the information indicating the geometry of the object may be received by a device, such as a computing device or server, as examples. The information indicating the geometry of the object may include a wireframe built of a plurality of triangles or other polygons that are used to approximate the geometric surface of the object. The wireframe triangular mesh may thus represent a 3D object data model. Further, the plurality of images may be received by a device, such as a computing device or server, as examples. The plurality of images may be captured by a camera, such as a CCD TV camera as an example, and the plurality of images may include images of the object taken from different angles.

As discussed above in relation to FIG. 2A, the first objective in assigning images to triangles of a triangular mesh is to maximize the texture resolution of the assigned image for each individual triangle. This objective can be accomplished by block 254 of method 250. At block 254, the method 250 includes assigning images of the plurality of images that have a resolution above a threshold to triangles of the plurality of triangles. This may be performed to obtain an initial assignment which is locally optimal for every triangle. To this end, the object data model processor 112 may be configured to compute for each image the triangles that are visible in that particular image. Next, the object data model processor 112 may project every triangle to all the images in which the object is visible and computes the resolution of the projected texture. The triangle may then be assigned to the image with the highest resolution. The visibility can be computed using z-buffer algorithm, as an example.

As discussed above in relation to FIG. 2A, the second objective in assigning images to triangles of a triangular mesh is to minimize the total length of the boundaries between texture models. Blocks 256-260 of method 250 describe an example process for optimizing this second objective. At block 256, the method 250 includes determining adjacent polygons that are assigned to different images of the plurality of images so as to identify boundaries of images. In this context, a "boundary" may refer to an edge (e.g., two vertices in the mesh such that there is a single triangle that contains both) in which the two triangles sharing that edge are assigned to different images.

At block 258, the method 250 includes determining an image of the plurality of images that is assigned to a threshold number of polygons in a proximity of one of the adjacent polygons. In an example implementation, for each triangle t in the geometric triangular mesh G, the data model processor 112 may compute a set of triangles in G within a threshold distance d from t. The data model processor 112 may next compute the image I with the most triangles in the set of triangles assigned to that given image.

At block 260, the method 250 includes reassigning the image that is assigned to the threshold number of polygons to the adjacent polygons so as to modify the boundaries of images. Using the example described above, the data model processor 112 may assign t to I. The process described in blocks 256-260 may thus reduce the number of boundaries of images, thereby reducing the number of transitions between image assignments. The process described in blocks 256-260 ignores the location of the boundaries, which may affect the visibility of the seam between triangles. This stems from the fact that when the boundary is in a texture region with a gradient difference between the texture regions that is below a threshold value, even relatively large misalignments of texture regions can be blended away with further processing to further eliminate seams between assigned images. In contrast, when the gradient difference between texture regions of a boundary exceeds a threshold value, even slight misalignments of texture regions can cause differences that are hard to conceal with blending once the image assignment is set. Thus, it is desirable to aim for an image assignment that minimizes the transitions in texture regions where the gradient difference between texture regions are high, especially when there is disagreement between the assignment of the images.

As discussed above in relation to FIG. 2A, the third objective in assigning images to triangles of a triangular mesh is to minimize the boundary crossings in highly textured areas. Blocks 262-264 of method 250 describe an example process for optimizing this third objective. At block 262, the method 250 includes determining a mismatch factor for boundaries of the modified boundaries of images. A highly textured area is an area where an image experiences significant changes, such as a change in color, pixel value, or gradient. In order to optimize the third objective, the processor may use a notion of mismatch factor of an image assignment of a model and implement a local and iterative method that in each step changes the assignment in a local region of the mesh in order to reduce a gradient variation between bordering assigned images. A function used for the mismatch factor may have the following two properties: (1) output high values when the transition between the texture in the separated views is smooth, i.e. the seam is invisible; and (2) output low values if the transition between the texture in the separated views is not smooth, i.e. the seam is visible.

For a triangle t and view v, GP(t, v) may denote the 2D image gradient of the back-projection of view v to t. Next, the triangle mismatch factor of triangle t and views $v_1$ and $v_2$ may be determined as:

$$MM_{triangle}(t,v_1,v_2) := \text{Sum}(|GP(t,v_1) - GP(t,v_2)|).$$

This represents the sum of the absolute values of the difference between the gradients of the triangle as back-projected from $v_1$ and $v_2$.

Next, the mismatch factor of adjacent triangles $t_1$, $t_2$ and views $v_1$, $v_2$ can be defined as:

$$MM_{boundary}(t_1,t_2,v_1,v_2) := MM_{triangle}(t_1,v_1,v_2) + MM_{triangle}(t_2,v_1,v_2).$$

Finally, the total mismatch factor of a mesh G and calibrated views V with an assignment I can be defined as:

$$MM_{assignment}(G, V, I) := \sum_{t \text{ in } G} \sum_{t' \text{ adjacent to } t} MMboundary(t, t', I(t), I(t'))$$

Note that only triangles on the boundaries of the assignment contribute to the sum.

At block 264, the method 250 includes reassigning images in boundaries having a mismatch factor above a threshold so as to reduce a gradient variation between the images in the modified boundaries. In an example embodiment, the data model processor 112 may determine a first seam that represents a separation of a first group of triangles assigned to a first image of the plurality of images, and a second group of triangles assigned to a second image of the plurality of images. The first seam may include a boundary of the first image and second image with a mismatch factor above the threshold. The first seam may further include two endpoints, $p_1$ and $p_2$. Next, the data model processor 112 may compute T, the set of triangles within a threshold graph distance d from a triangle $t_1$ assigned to the first image. Then the data model processor 112 may compute the mismatch factor for every adjacent triangle pair in T, using the first image and the second image as the views. Next, the data model processor 112 may compute the shortest path from $p_1$ and $p_2$, which may result in a second seam. In one example, the shortest path may be determined using Dijkstra's algorithm, with the mismatch factor determined above as the weights, and $p_1$ and $p_2$ as the source and sink vertices. Finally, the data model processor 112 may flip the image assignment of all the triangles between the second seam and the first seam, so that triangles that were assigned to the first image are reassigned to the second image, and vice versa. Other example embodiments are possible as well.

Figure 3A:
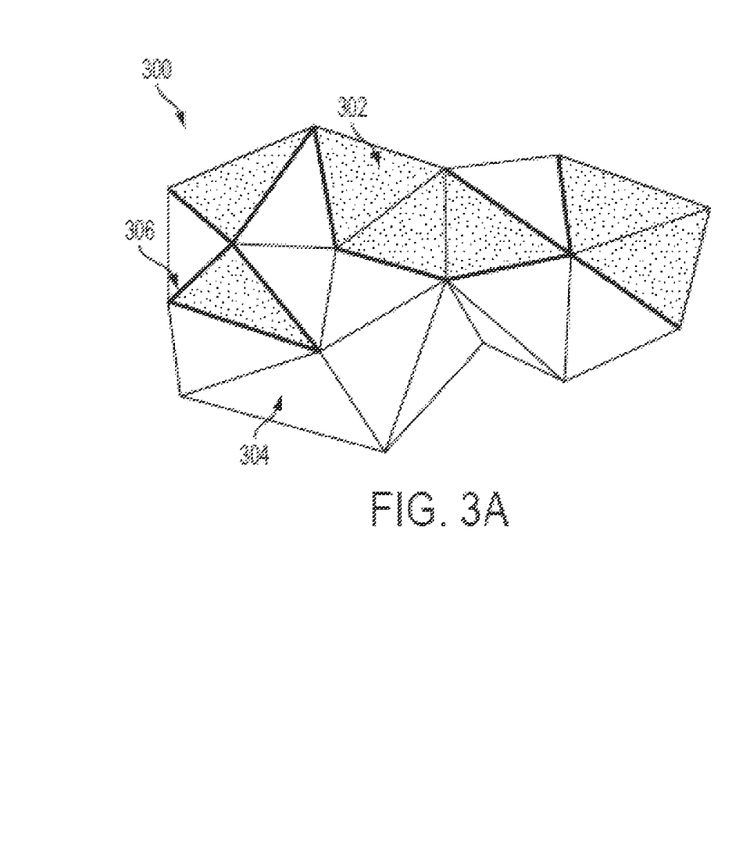
FIG. 3A is a conceptual illustration of a 3D object model, arranged according to at least some embodiments presented herein.
Figure 3B:
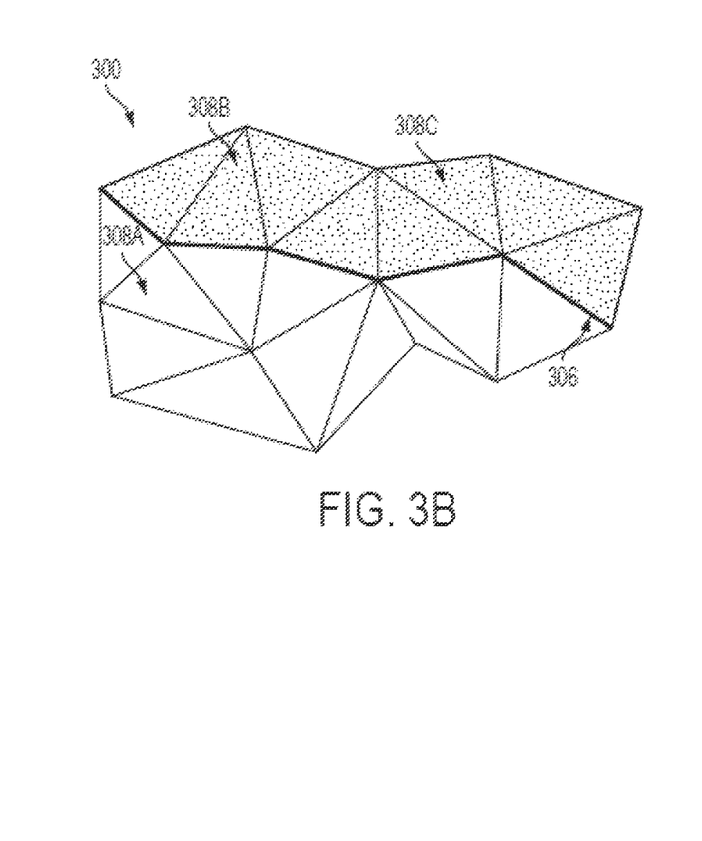
FIG. 3B is a conceptual illustration of a 3D object model, arranged according to at least some embodiments presented herein.

FIGS. 3A-3B are conceptual illustrations of a 3D object model 300 in the image assignment stage. In particular, FIG. 3A represents an image assignment that maximizes the texture resolution of the assigned image for each individual triangle. Such an image assignment may be implemented using the process described in relation to block 254 of FIG. 2B, as an example. Using image resolution as the determining factor in assigning images to each triangle leads to groups of triangles textured from a common image, which may be referred to as surface regions. Because those surface regions are inhomogeneous, a large number of distorted boundaries exist between the assigned images.

FIG. 3A illustrates a surface region of a 3D object model 300. The 3D object model has a plurality of triangles 302, 304 that create a triangular mesh that approximate the geometric surface of the 3D object model 300. The shaded triangles 302 represent triangles assigned to a first image. The light triangles 304 represent triangles assigned to a second image. The shaded triangles 302 and the light triangles 304 are separated by boundaries 306. In order to reduce the number of boundaries 306 between the triangles assigned to the first image and the triangles assigned to the second image, an exemplary method may be applied which reassigns images to the triangles so that the surface regions are more homogenous. For example, the exemplary method may include the method described in blocks 256-260 of FIG. 2B, as described above.

The effect of reassigning the images is shown in FIG. 3B. Three of the triangles 308A-C are reassigned using the method described in blocks 256-260 of FIG. 2B. The resulting number of boundaries 306 therefore is reduced from 11 to 5 in this example, and the resulting surface regions are more homogenous.

Figure 4A:
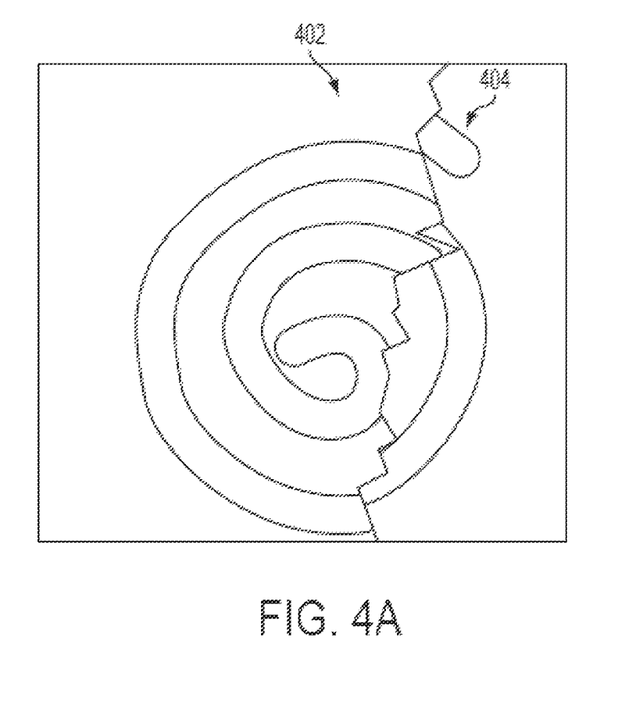
FIG. 4A illustrates a highly textured area of a 3D object model, arranged according to at least some embodiments presented herein.

FIG. 4A illustrates a highly textured area with a seam. As discussed above, Algorithm 1 ignores the location of the boundaries, which can affect the visibility of the seam between triangles. For example, when the gradient difference between texture regions exceeds a threshold, even slight misalignments between the views can cause differences that are hard to conceal blending once the alignment is set. Thus, it is desirable to aim for an assignment that minimizes the transitions in texture regions with a lot of details when there is disagreement between the image assignments. As shown in FIG. 4A, a first area 402 is textured using a first image. A second area 404 is textured using a second image. The transition between the separated views results in a visible seam.

Figure 4B:
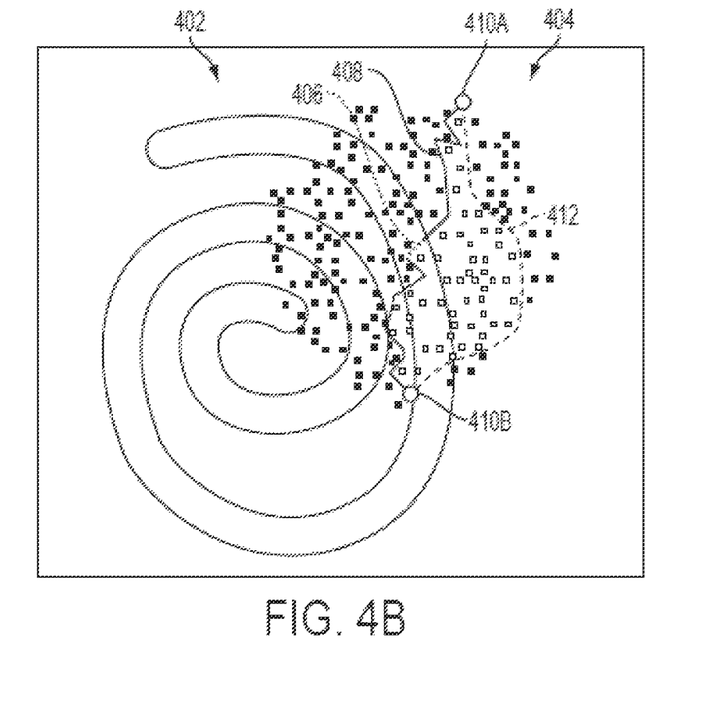
FIG. 4B illustrates a visualization of a mismatch factor minimization algorithm, arranged according to at least some embodiments presented herein.

FIG. 4B illustrates a visualization of a mismatch factor minimization algorithm, such as the method described in blocks 262-264 of FIG. 2B. As shown in FIG. 4B and with reference to the method described in blocks 262-264 of FIG. 2B, the boundary 406 between input boundary triangles $t_1$ and $t_2$ illustrates a boundary between two images. In the first area, triangles are assigned to a first image 402 for texturing and in the second area, triangles are assigned to a second image 404 for texturing. As in FIG. 4A, the transition between the separated views results in a visible seam. Differences in color between the images are shown, as well as misalignment. The boundary 406 is identified as a problematic location because there is a disagreement between views and the mismatch factor exceeds a threshold, as discussed above. The original seam 408 includes two end points 410A-B, which are described above in reference to FIG. 2B as $p_1$ and $p_2$. Using two points on the boundary 410A-B that are further away from boundary 406, the algorithm can select a new seam 412 between views that is constrained to be with same end points 410A-B. The goal is to minimize the mismatch factor with the end points 410A-B fixed, thereby moving the seam to a place that is less visible. The images assigned to triangles located between the original seam 408 and the new seam 412 are reassigned from the second image 404 to the first image 402.

Figure 5:
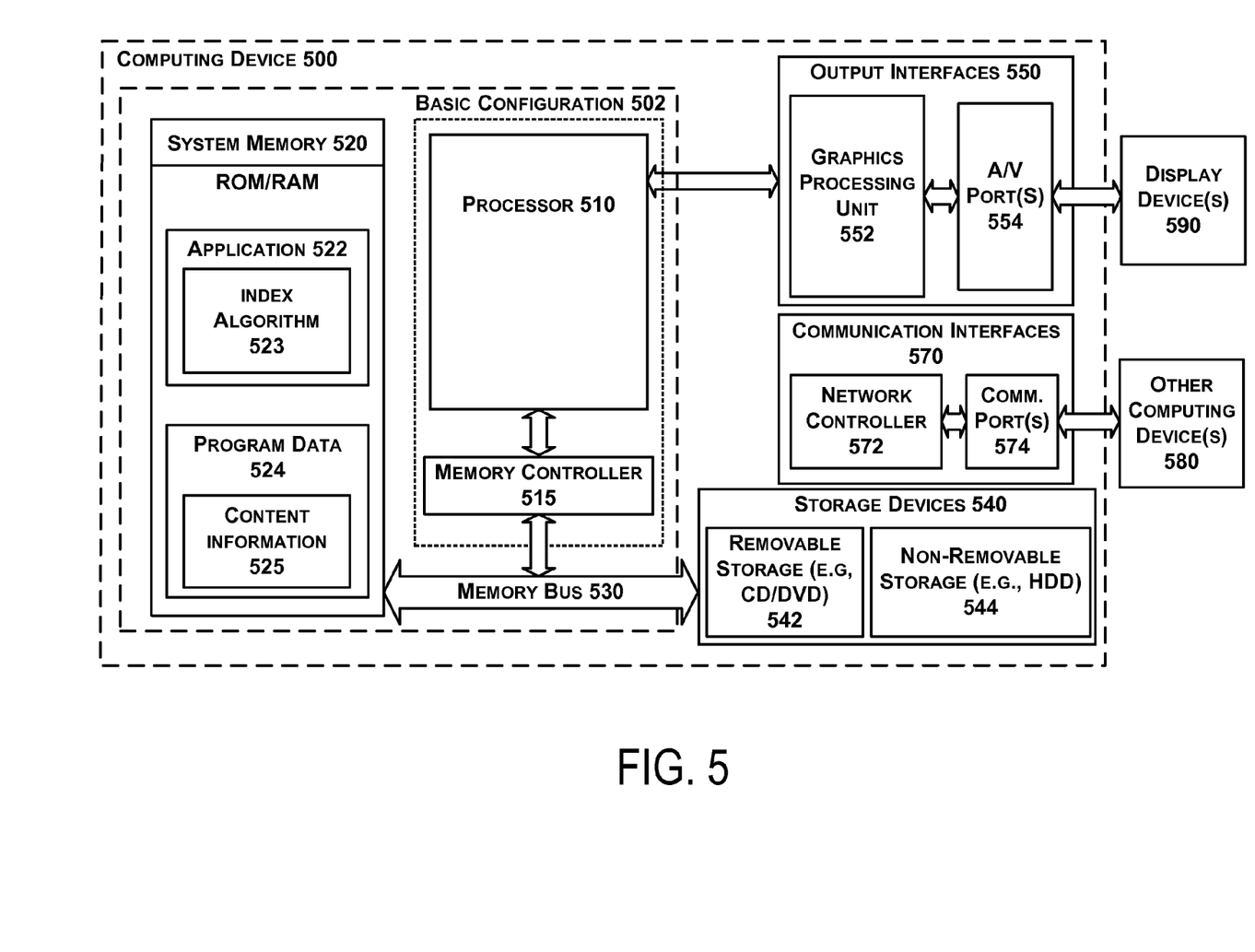
FIG. 5 is a functional block diagram illustrating an example computing device used in a computing system that is arranged in accordance with at least some embodiments described herein.

FIG. 5 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for seamless texturing of 3D meshes from multiple calibrated views as described in FIGS. 1-4B. In a basic configuration 502, computing device 500 may typically include one or more processors 510 and system memory 520. A memory bus 530 can be used for communicating between the processor 510 and the system memory 520. Depending on the desired configuration, processor 510 can be of any type including but not limited to a microprocessor (μP), a microcontroller (μC), a digital signal processor (DSP), or any combination thereof. A memory controller 515 can also be used with the processor 510, or in some implementations, the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 may include one or more applications 522, and program data 524. Application 522 may include an index algorithm 523 that is arranged to provide inputs to the electronic circuits, in accordance with the present disclosure. Program data 524 may include content information 525 that could be directed to any number of types of data. In some example embodiments, application 522 can be arranged to operate with program data 524 on an operating system.

Computing device 500 can have additional features or functionality, and additional interfaces to facilitate communications between the basic configuration 502 and any devices and interfaces. For example, data storage devices 540 can be provided including removable storage devices 542, non-removable storage devices 544, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 520 and storage devices 540 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include output interfaces 550 that may include a graphics processing unit 552, which can be configured to communicate to various external devices such as display devices 590 or speakers via one or more A/V ports 554 or a communication interface 570. The communication interface 570 may include a network controller 572, which can be arranged to facilitate communications with one or more other computing devices 580 over a network communication via one or more communication ports 574. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

Figure 6:
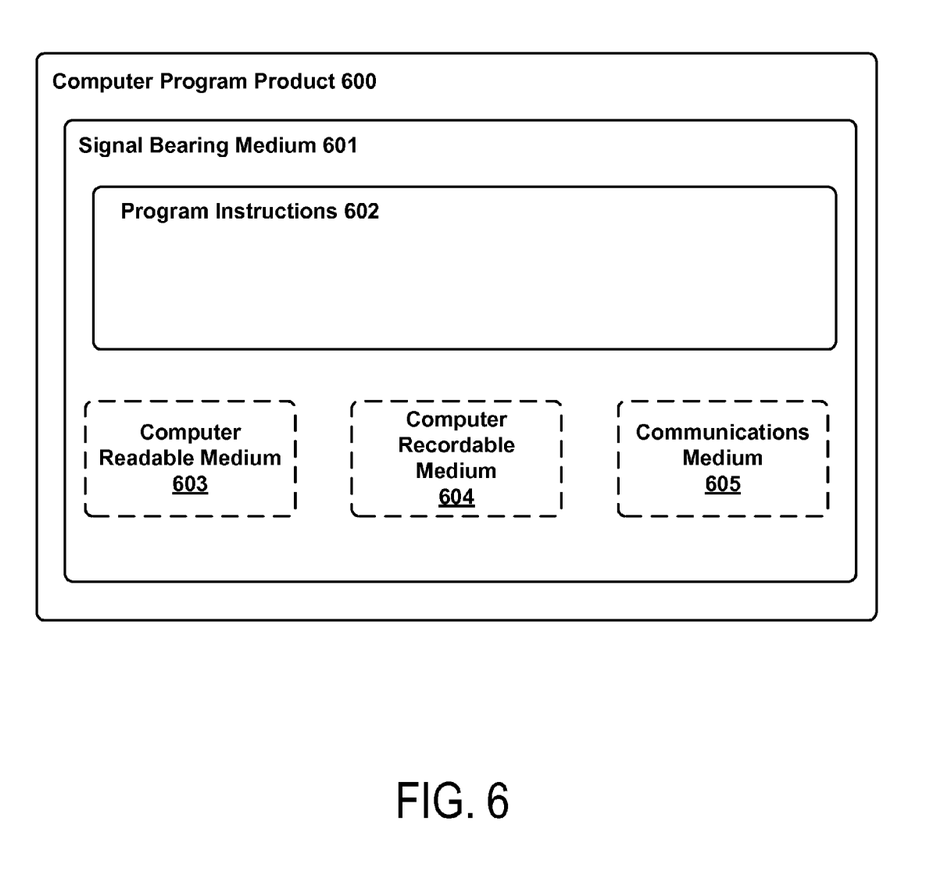
FIG. 6 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 601. The signal bearing medium 601 may include one or more programming instructions 602 that, when executed by one or more processors may provide functionality or portions of the functionality described above with respect to FIGS. 1-4B. In some examples, the signal bearing medium 601 may encompass a computer-readable medium 603, such as, but not limited to, a hard disk drive, a Compact Disc (CD), a Digital Video Disk (DVD), a digital tape, memory, etc. In some implementations, the signal bearing medium 601 may encompass a computer recordable medium 604, such as, but not limited to, memory, read/write (R/W) CDs, R/W DVDs, etc. In some implementations, the signal bearing medium 601 may encompass a communications medium 605, such as, but not limited to, a digital and/or an analog communication medium (e.g., a fiber optic cable, a waveguide, a wired communications link, a wireless communication link, etc.). Thus, for example, the signal bearing medium 601 may be conveyed by a wireless form of the communications medium 605 (e.g., a wireless communications medium conforming with the IEEE 802.11 standard or other transmission protocol).

The one or more programming instructions 602 may be, for example, computer executable and/or logic implemented instructions. In some examples, a computing device such as the computing device 500 of FIG. 5 may be configured to provide various operations, functions, or actions in response to the programming instructions 602 conveyed to the computing device 600 by one or more of the computer readable medium 603, the computer recordable medium 604, and/or the communications medium 605.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses (and any combination of the clauses) further describe aspects of the present description.

We claim:

1. A method comprising:
receiving information indicating a geometry of an object, wherein the information indicating the geometry of the object comprises a plurality of polygons that approximate at least a portion of a geometric surface of the object;
receiving a plurality of images of the object, wherein each of said plurality of images illustrate the object from a different respective angle;
assigning images of the plurality of images that have a resolution above a threshold to polygons of the plurality of polygons;
determining adjacent polygons that are assigned to different images of the plurality of images so as to identify boundaries of images;
determining, by a processor, an image of the plurality of images that is assigned to a threshold number of polygons in a proximity of one of the adjacent polygons;
reassigning the image that is assigned to the threshold number of polygons to the adjacent polygons so as to modify the boundaries of images;
determining a mismatch factor for boundaries of the modified boundaries of images; and
reassigning images in boundaries having a mismatch factor above a threshold so as to reduce a gradient variation between the images in the modified boundaries.

2. The method of claim 1, further comprising:
generating a three-dimensional (3D) image of the object such that the geometry of the object has an associated texture based on the respective images assigned to the respective polygons.

3. The method of claim 2, further comprising:
rendering the 3D image of the object for display.

4. The method of claim 2, wherein the images of the plurality of images include information indicating texture of the object, and wherein the method further comprises:
blending the associated textures from the plurality of images.

5. The method of claim 1, wherein the image assigned to the threshold number of polygons is reassigned to the adjacent polygons based on the resolution of the image assigned to the threshold number of polygons exceeding a threshold resolution.

6. The method of claim 1, wherein reassigning images in boundaries having a mismatch factor above a threshold comprises:
determining a first seam in the plurality of polygons, wherein the first seam represents a separation of a first group of polygons assigned to a first image of the plurality of images and a second group of polygons assigned to a second image of the plurality of images, and wherein the first seam includes a boundary of the modified boundaries of images with a mismatch factor above the threshold;
determining a second seam having two endpoints located on the first seam, wherein the second seam includes a boundary of the modified boundaries of images with a mismatch factor below the threshold; and
reassigning the images assigned to polygons located between the first seam and the second seam from the first image to the second image.

7. The method of claim 1, wherein the mismatch factor for boundaries of the modified boundaries of images comprises a difference between a gradient of a first polygon and a gradient of a second polygon, wherein the first and second polygons share an edge, and wherein the first and second polygons are assigned to different images of the plurality of images.

8. The method of claim 1, wherein the plurality of polygons include a plurality of triangles.

9. A non-transitory computer readable medium having stored thereon instructions, that when executed by a computing device, cause the computing device to perform functions comprising:
receiving information indicating a geometry of an object, wherein the information indicating the geometry of the object comprises a plurality of polygons that approximate at least a portion of a geometric surface of the object;
receiving a plurality of images of the object, wherein each of said plurality of images illustrate the object from a different respective angle;
assigning images of the plurality of images that have a resolution above a threshold to polygons of the plurality of polygons;
determining adjacent polygons that are assigned to different images of the plurality of images so as to identify boundaries of images;

determining an image of the plurality of images that is assigned to a threshold number of polygons in a proximity of one of the adjacent polygons;

reassigning the image that is assigned to the threshold number of polygons to the adjacent polygons so as to modify the boundaries of images;

determining a mismatch factor for boundaries of the modified boundaries of images; and reassigning images in boundaries having a mismatch factor above a threshold so as to reduce a gradient variation between the images in the modified boundaries.

10. The non-transitory computer readable medium of claim 9, wherein the functions further comprise:

generating a three-dimensional (3D) image of the object such that the geometry of the object has an associated texture based on the respective images assigned to the respective polygons; and rendering the 3D image of the object for display.

11. The non-transitory computer readable medium of claim 10, wherein the images of the plurality of images include information indicating texture of the object, and wherein the functions further comprise:

blending the associated textures from the plurality of images.

12. The non-transitory computer readable medium of claim 9, wherein the image assigned to the threshold number of polygons is reassigned to the adjacent polygons based on the resolution of the image assigned to the threshold number of polygons exceeding a threshold resolution.

13. The non-transitory computer readable medium of claim 9, wherein reassigning images in boundaries having a mismatch factor above a threshold comprises:

determining a first seam in the plurality of polygons, wherein the first seam represents a separation of a first group of polygons assigned to a first image of the plurality of images and a second group of polygons assigned to a second image of the plurality of images, and wherein the first seam includes a boundary of the modified boundaries of images with a mismatch factor above the threshold;

determining a second seam having two endpoints located on the first seam, wherein the second seam includes a boundary of the modified boundaries of images with a mismatch factor below the threshold; and reassigning the images assigned to polygons located between the first seam and the second seam from the first image to the second image.

14. The non-transitory computer readable medium of claim 9, wherein the mismatch factor for boundaries of the modified boundaries of images comprises a difference between a gradient of a first polygon and a gradient of a second polygon, wherein the first and second polygons share an edge, and wherein the first and second polygons are assigned to different images of the plurality of images.

15. A system comprising:

at least one processor; and data storage including program instructions stored thereon that when executed by the at least one processor, cause the system to:

receive information indicating a geometry of an object, wherein the information indicating the geometry of the object comprises a plurality of polygons that approximate at least a portion of a geometric surface of the object;

receive a plurality of images of the object, wherein each of said plurality of images illustrate the object from a different respective angle;

assign images of the plurality of images that have a resolution above a threshold to polygons of the plurality of polygons;

determine adjacent polygons that are assigned to different images of the plurality of images so as to identify boundaries of images;

determine an image of the plurality of images that is assigned to a threshold number of polygons in a proximity of one of the adjacent polygons;

reassign the image that is assigned to the threshold number of polygons to the adjacent polygons so as to modify the boundaries of images;

determine a mismatch factor for boundaries of the modified boundaries of images; and reassign images in boundaries having a mismatch factor above a threshold so as to reduce a gradient variation between the images in the modified boundaries.

16. The system of claim 15, wherein the program instructions are further executable by the at least one processor to cause the system to:

generate a three-dimensional (3D) image of the object such that the geometry of the object has an associated texture based on the respective images assigned to the respective polygons; and render the 3D image of the object for display.

17. The system of claim 16, wherein the images of the plurality of images include information indicating texture of the object, and wherein the program instructions are further executable by the at least one processor to cause the system to:

blend the associated textures from the plurality of images.

18. The system of claim 15, wherein the image assigned to the threshold number of polygons is reassigned to the adjacent polygons based on the resolution of the image assigned to the threshold number of polygons exceeding a threshold resolution.

19. The system of claim 15, wherein reassigning images in boundaries having a mismatch factor above a threshold comprises:

determining a first seam in the plurality of polygons, wherein the first seam represents a separation of a first group of polygons assigned to a first image of the plurality of images and a second group of polygons assigned to a second image of the plurality of images, and wherein the first seam includes a boundary of the modified boundaries of images with a mismatch factor above the threshold;

determining a second seam having two endpoints located on the first seam, wherein the second seam includes a boundary of the modified boundaries of images with a mismatch factor below the threshold; and reassigning the images assigned to polygons located between the first seam and the second seam from the first image to the second image.

20. The system of claim 15, wherein the mismatch factor for boundaries of the modified boundaries of images comprises a difference between a gradient of a first polygon and a gradient of a second polygon, wherein the first and second polygons share an edge, and wherein the first and second polygons are assigned to different images of the plurality of images.

* * * * *